United States Patent [19]

Chen et al.

[11] Patent Number: 5,158,795
[45] Date of Patent: * Oct. 27, 1992

[54] FLAVORANTS DERIVED FROM FATS AND OILS

[75] Inventors: Teh-Kuei Chen, Gaylordsville; John S. Tandy, Litchfield, both of Conn.

[73] Assignee: Nestec S.A., Vevey, Switzerland

[*] Notice: The portion of the term of this patent subsequent to Jan. 7, 2009 has been disclaimed.

[21] Appl. No.: 693,332

[22] Filed: Apr. 29, 1991

Related U.S. Application Data

[63] Continuation of Ser. No. 239,789, Sep. 1, 1988, Pat. No. 5,079,017.

[51] Int. Cl.$^5$ ............................................. A23L 1/226
[52] U.S. Cl. .................................. 426/312; 426/533; 426/650
[58] Field of Search ...................... 426/533, 650, 312

[56] References Cited

U.S. PATENT DOCUMENTS 3,102,817  9/1963  Green .
4,094,997  6/1978  Aishima et al. .
4,571,342  2/1986  DiCicca et al. .
4,604,290  8/1986  Lee et al. .

Primary Examiner—Joseph Golian
Attorney, Agent, or Firm—Vogt & O'Donnell

[57] ABSTRACT

Flavorants are obtained by collecting at least one of differing volatile fractions evolved over differing periods of time from a liquid pool of at least one fat or one oil and mixtures thereof into which oxygen is introduced while being heated to a temperature of from 300° C. to 475° C.

15 Claims, 1 Drawing Sheet

FLAVORANTS DERIVED FROM FATS AND OILS

CROSS REFERENCE TO RELATED APPLICATION

This is a continuation of application Ser. No. 07/239,789 filed Sep. 1, 1988, now U.S. Pat. No. 5,079,017.

BACKGROUND OF THE INVENTION

The present invention relates to a process for the preparation of a flavouring composition.

In U.S. Pat. No. 4,571,342 there is described a process for the preparation of a flavouring composition with a charcoal broiled flavour which is prepared by subjecting a film of fat or oil to a temperature within the range of from 285° C. to 475° C. in the presence of oxygen for a period of time effective to develop a charcoal broiled flavour and collecting the resultant fat or oil. In the process described in this patent, the film of the fat or oil is subjected to these temperatures in a continuous feed thin film reactor. However, in such a reactor, since fresh material is constantly being added, it is impossible to obtain fractions that differ in composition and flavour since, for any moment in time, the same degree of heating is taking place. Moreover, since the fat or oil is in the form of a film, in order to obtain a desirable flavour, it is essential that the duration of the treatment at these temperatures is extremely short because, whether in a continuous or a batch reactor, at such high temperatures, the film of fat or oil would rapidly become pyrolysed and polymerised and would have a distinctly unpleasant flavour.

U.S. Pat. No. 4,094,997 describes a process for preparing a beef flavour substance which comprises preheating an animal fat at 130° to 220° C., mixing the preheated fat with brewed soy sauce and heating at 130° to 220° C. for 5 to 30 minutes, which mixture may afterwards be distilled with steam or with vapour of an organic solvent.

SUMMARY OF THE INVENTION

We have found, surprisingly, that a variety of desirable flavours, distinctly different from those obtained by the processes of U.S. Pat. Nos. 4,571,342 and 4,094,997 can be obtained by distilling a fat or oil starting material which is in the form of a liquid pool wherein the heating may be carried out at a temperature from 300° to 475° C. for prolonged periods in a special batch type apparatus. In U.S. Pat. No. 4,094,997 the volatiles produced by the initial heating of the fat at 130° to 220° C. and the beef flavour molecules formed by distillation only after reactions have taken place between the fat and the soy sauce, are very different from the volatiles formed in our invention by heating only fats or oils at a temperature from 300° to 475° C. and simultaneous distillation of the flavourant molecules.

Accordingly, the present invention provides a process for the preparation of a flavouring composition which comprises subjecting a fat or oil or any mixture of two or more fats or oils thereof in the form of a liquid pool to a temperature of from 300° C. to 475° C. in the presence of oxygen in a batch type apparatus provided with gas inlet and outlet ports and means for collecting the volatiles distilled.

Conveniently, oxygen enters the gas inlet port, exits from the gas outlet port carrying with it the volatiles distilled and preferably passes through the collecting means before being vented to the atmosphere.

The recovery of the volatiles distilled in the reaction may be achieved by any effective conventional means such as a cold trap, a condensor or a water trap. If desired, several traps may be used. For example, when a condensor is used, it may be cooled, for instance, to from 4° C.–10° C. by circulating water or refrigerant through it.

Preferably the batch type apparatus is provided with a cold trap or condenser and a cold water trap wherein the oxygen exiting from the outlet passes through the cold trap and the cold water trap before being vented to the atmosphere. The batch type apparatus should be capable of withstanding the high temperatures involved, and a bomb reactor is particularly suitable. The use of pressure is not excluded.

DETAILED DESCRIPTION OF THE INVENTION

The fat or oil may be any animal or vegetable fat or oil or any glyceride of a fatty acid, e.g., beef fat, beef tallow, chicken fat, fish oil such as cod liver oil, safflower, seed oil (high oleic), linseed, olive, blackcurrant seed, grapeseed, low erucic acid rapeseed, coconut, peanut, cotton seed, palm, corn, partially hydrogenated soy oil, or any mixtures thereof. If desired, the fat or oil may be used in admixture with one or more fatty acids, for example, lauric acid, palmitic acid, stearic acid, oleic acid, or linoleic acid or with fatty acid mixtures such as butter acids, dairy acids cheese acids, enzyme hydrolysed vegetable oils, such as olive oil or coconut oil, or enzyme hydrolysed animal fats. Examples of such mixtures are a mixture of beef fat and oleic acid in a ratio of from 2:1 to 4:1 and a mixture of chicken fat and linoleic acid in a ratio of from 2:1 to 6:1.

By "in the form of a liquid pool" we mean that the fat or oil starting material should not be in the form of a film, i.e., it should not be in the form of a thin layer, sheet or droplets, and particularly should not be a film with a thickness of less than 5 mm. Conveniently, the fat or oil starting material lies as a liquid or melted pool at the bottom of the reactor If desired, flavour precursors may be added to the fat or oil prior to the heat treatment to enhance the flavour, e.g., sulphur-containing compounds such as cysteine, cystine, methionine, thiamine, hydrogen sulphide, or sulphur-containing extract from vegetables such as onions, garlic or members of the BRASSICA family.

Preferably, the temperature to which the fat or oil or mixtures thereof is subjected is from 310° C. to 400° C. and especially from 325° C. to 375° C. The time of the treatment may be from a few seconds, e.g., 10 seconds to several hours, more usually from 1 minute to 6 hours, and preferably from about 5 minutes to 4 hours. The actual period of time chosen may be the time effective to produce the desired flavour notes which are generally roasted, grilled and smokey, longer periods generally producing more roasted flavour notes.

The flavourants created by the process of the present invention depend on the fat or oil employed, and the use of the batch type apparatus is especially advantageous because the volatiles distilled or carried by the air flow out of the reactor and can be collected and used as a flavourant. In addition, distillates offer the advantage of fractionating the volatiles with time to produce a broader range of flavourants, each having a different flavour, which can be used either individually or in combination with other fractions to obtain an even broader range of flavourants. Distillates offer another advantage in that any polymeric materials, which are objectionable yet unavoidable side products in high temperature reactions of fats or oils, are left behind in the reactor and are not present in the flavourants. Moreover, there is usually a significant amount of water distilled over with the volatiles generated in a batch-type apparatus, and if this water is separated from the volatiles, it can also be used as a flavourant.

Thus, by varying the initial fat or oil material employed, the reaction temperature, the intervals of time used for collecting the volatiles and the specific combinations of the fractions, a myriad number of flavour notes can be generated from a single fat or oil. In addition, two or more fractions obtained from different processes according to this invention may be used as flavourants.

By the process of the present invention, flavours can be obtained which can be specifically targeted towards a wide variety of meats, chicken, fish or cheese depending on the starting fat or oil material employed, the temperature used and the specific times that the volatile fractions are taken as well as the combinations of the fractions.

The oxygen present in the treatment is conveniently obtained from air, and preferably the air is passed through the fat or oil material, e.g., by bubbling, at a rate of from 10 to 5000 ml/min, especially from 15 to 3000 ml/min per 100 g of fat or oil material. The use of pressurised reactions to provide sufficient oxygen is not excluded.

The flavouring composition produced by the process of the present invention may be used in the powdered form which may be obtained by spray drying in admixture with carriers which can encapsulate the flavouring composition, e.g., gum arabic, malto-dextrin modified, food starches, dextrins or a protein such as gelatin. Advantageously, a solution or an emulsion of the flavouring composition and carrier is formed which is dried, for example, by spray-drying. The amount of flavouring composition present is usually from 2.5% to 50% and preferably from 5% to 30% by weight based on the total weight of the flavouring composition and the carrier. Since the distillates produced are very volatile, preferably the techniques used to encapsulate them should substantially inhibit reactions which might take place with other materials that the flavourant may subsequently be blended with.

The flavouring composition can be used by itself, dispersed in a fat, or in admixture with a carrier, for incorporation into, or coating onto a wide variety of foodstuffs to impart the specific flavour, e.g., meats, sauces, soups, etc.

BRIEF DESCRIPTION OF THE DRAWING

The present invention will now be further illustrated by way of example with reference to the accompanying drawing in which.

DETAILED DESCRIPTION OF THE DRAWING

Figure 1:
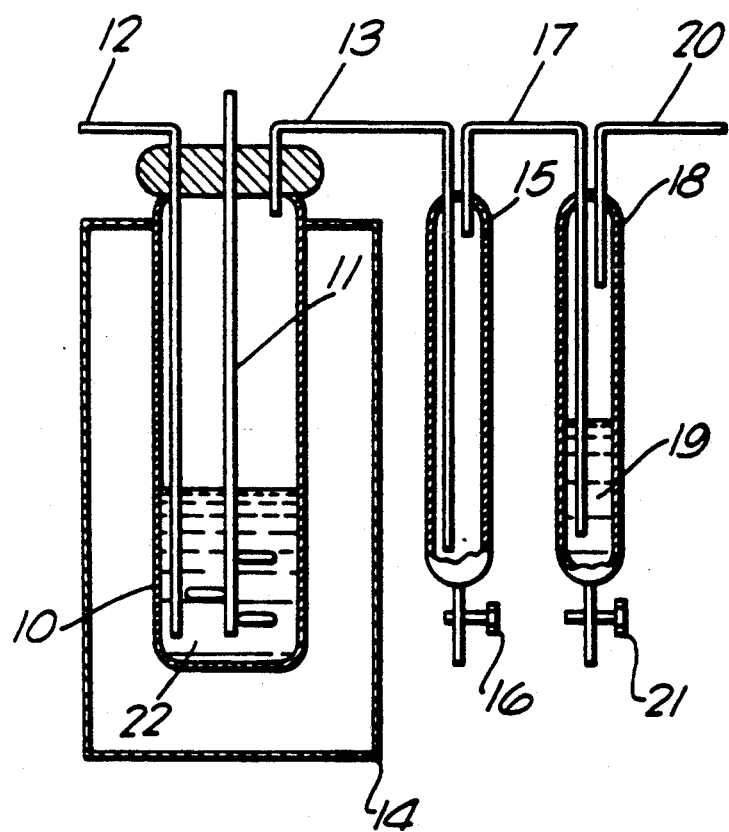
FIG. 1 represents a bomb apparatus which may be employed as the reactor.

Referring to FIG. 1, the apparatus comprises a 600 ml bomb (10), fitted with a stirrer (11), an air inlet (12) and an air outlet (13), surrounded by a bomb jacket (14) provided with a heating element (not shown). The air outlet (13) passes into the top of a cold trap (15) fitted with a tap (16) and an air outlet (17) which in turn passes into the top of a cold water trap (18) containing 400 ml water (19) and fitted with an air outlet (20) to the atmosphere and a tap (21). Both traps (15) and (18) are maintained at a temperature of 4° C. by being immersed in ice-baths (not shown).

In operation, 100 g of fat or oil material (22) is introduced into the bomb and air is passed at 2000 ml/min through the air inlet (12) and bubbled through the fat or oil material which is agitated by the stirrer (11) and heated to the appropriate temperature. The air outlet (13) allows the passage of the air and the volatiles distilled from the fat or oil material by gas "stripping", into the cold trap (15). Any volatiles which pass cold trap (15) can be further collected in the cold trap (18) by passing through the air outlet (17).

The volatiles collected in the cold trap (15) are further fractionated by time whereby all the volatile material distilled from the bomb (10) into the cold trap (15) between 0 and 5 minutes is run off from the tap (16) and collected as one flavourant, the volatiles distilled into the trap between 5 and 10 minutes are collected as a second flavourant, those between 10 and 15 minutes are collected as a third flavourant, etc., and further fractions collected until no further volatiles are generated from the bomb. Each fraction collected has a different flavour. A significant amount of water distills over with the fat-soluble volatiles generated in the bomb and this water is separated to give a further flavourant. The volatile material which is collected in the water trap (18) is run off from tap (21) and collected to give yet another flavour.

EXAMPLES

The following Examples further illustrate the present invention:

EXAMPLE 1

Using the apparatus illustrated in FIG. 1, 200 grams of chicken fat were placed in the bomb and heated to 350° C. with stirring. Air was passed through at 3100 ml/min. Five minutes after the temperature had reached 350° C., the first fraction was collected and the fractionation was continued as follows:

| Fraction | Time | Yield (g) | Description of Organoleptic evaluation |
|---|---|---|---|
| 1 | 0–5 | 4.3 | |
| 2 | 5–11 | 20.7 | white chicken meat |
| 3 | 11–20 | 32.5 | roasting skin |
| 4 | 20–25 | 17.6 | BBQ chicken |
| 5 | 25–30 | 14.6 | crispy skin |
| The combined water phase | | 9.2 | more meaty grill flavour |
| Total yield | | 98.9 | |

15 mg of the above fractions were mixed with 2.8 g of hydrolysed plant protein and hydrated with 240 ml of boiling water. The organoleptic evaluation of the respective fractions with hydrolysed plant protein are described above.

EXAMPLE 2

By following a similar procedure to that described in Example 1, but using 220 g of rendered bacon pork fat, a comparable series of flavour fractions were obtained as follows:

| Fraction | Time | Yield (g) | Description of Organoleptic evaluation |
|---|---|---|---|
| 1 | 0–5 | 6.5 | |
| 2 | 5–13 | 35.0 | Meaty and brothy |
| 3 | 13–19 | 23.2 | Meaty with pork skin notes |
| 4 | 19–23 | 11.2 | Roasted |
| 5 | 23–26 | 8.7 | Roasted |
| The combined water phase | | 9.8 | Coffee-like background note |
| Total yield | | 94.4 | |

Twenty-four mg each of the above flavours were mixed with 2.8 g each of hydrolysed plant protein and hydrated with 240 ml of boiling water. The organoleptic evaluation of respective fractions are described above.

EXAMPLE 3

By following a similar procedure to that described in Example 1, but using 200 g of Mahaden fish oil and air was passed through at a rate of 2920 ml/min, a series of flavour fractions were obtained as follows:

| Fraction | Time | Yield (g) | Description of Organoleptic evaluation |
|---|---|---|---|
| 1 | 0–9 min | 36.3 | Strong fish flavour |
| 2 | 9–13 | 18.9 | Over roasted flavour |
| 3 | 13–16 | 10.0 | Over roasted flavour |
| 4 | 16–19 | 14.3 | Over roasted flavour |
| The combined water phase | | 8.2 | |
| Total yield | | 87.7 | |

Fifteen mg of the above fractions were mixed with 2.8 g of hydrolysed plant protein and hydrated with 240 ml of boiling water. The organaleptic evaluations are described above.

EXAMPLE 4

By following a similar procedure as described in Example 1, but using 200 g of beef fat and air was passed through at 3040 ml/min, a series of flavour fractions was obtained as follows:

| Fraction | Time | Yield (g) | Description of Organoleptic evaluation |
|---|---|---|---|
| 1 | 0–8 | 9.6 | |
| 2 | 8–19 | 21.3 | Roasted and buttery |
| 3 | 19–29 | 17.6 | Charcoal roasted |
| 4 | 29–36 | 9.6 | Grill and meaty |
| 5 | 36–42 | 9.0 | Gas grilled |
| The combined water phase | | 15.2 | |
| Total yield | | 82.4 | |

Fifteen mg each of the above flavour fraction was mixed with 2.8 g of hydrolysed plant protein and hydrated with 240 ml of boiling water. The organoleptic evaluations are described above.

COMPARATIVE EXAMPLE A

Using the apparatus illustrated in FIG. 1, 200 g of beef fat were placed in the bomb and heated to 250° C. with stirring. Air was passed through initially at a rate of 2030 ml/min and then increased to 3800 ml/min after 60 minutes and only 0.5 g of distillate was collected. A second fraction of 3.0 g was collected after 120 minutes of heating at 250° C.

| Fraction | Time | Air Flow (ml/min) | Yield (g) | |
|---|---|---|---|---|
| | 7 | 2300 | 0 | |
| 1 | 60 | 3800 | 0.5 | green vegetable note |
| 2 | 60–120 | 3800 | 3.0 | some meaty notes but green |
| The combined water phase | | | 1.0 | |
| Total yield | | | 4.5 g | |

Fifteen mg each of the above fractions were mixed with 2.8 g of hydrolysed plant protein and hydrated with 240 ml of boiling water. The organoleptic evaluations are described above.

COMPARATIVE EXAMPLE B

Using the apparatus illustrated in FIG. 1, 200 g of beef fat were heated to 275° C. with stirring. Air was passed through initially at a rate of 2800 ml/min, then increased to 3800 ml/min after 30 minutes. A first fraction was collected after 52 min and a second fraction was collected after 92 minutes.

| Fraction | Time | Yield (g) | Description Organoleptic evaluation |
|---|---|---|---|
| 1 | 0–52 | 2.1 | Roasted |
| 2 | 52–92 | 2.5 | Slightly grilled beef |
| The combined water phase | | 2.0 | Meaty |

Fifteen mg each of the above fractions were mixed with 2.8 g of hydrolysed plant protein and hydrated with 240 ml of boiling water. The organoleptic evaluations are described above.

We claim:

1. A product of a process comprising heating a material selected from a group consisting of at least one fat, one oil and mixtures thereof in form of a liquid pool to a temperature of from 300 1° C. to 475° C. while introducing oxygen into the heated liquid pool of material and collecting at least one of differing volatile fractions evolved over differing periods of time from the heated pool of material to thereby obtain flavorant products.

2. A product of the process according to claim 1 wherein the oxygen is introduced by bubbling air into the heated liquid pool of material at a rate of from 10 ml/min to 5000 ml/min per 100 gm of the heated pool of material.

3. A product of the process according to claim 1 further comprising stirring the heated liquid pool of material.

4. A product of the process according to claim 1 wherein differing volatile fractions are collected by a cold trap and by a cold water trap.

5. A product of the process according to claim 1 wherein differing volatile fractions are collected by a condenser and by a cold water trap.

6. A product of the process according to claim 1 wherein the liquid pool of material is heated to a temperature of from 310° C. to 400° C. for a period of from 1 minute to 6 hours.

7. A product of the process according to claim 1 further comprising combining at least two of the collected volatile fractions.

8. A product of the process according to claim 4 further comprising collecting water collected in the cold water trap.

9. A product of the process according to claim 5 further comprising collecting water collected in the cold water trap.

10. A product of the process according to claim 1 further comprising mixing at least one collected volatile fraction with a carrier.

11. A product of the process according to claim 10 wherein the at least one collected volatile fraction is in the form selected from a group consisting of a solution and an emulsion and is mixed with the carrier and further comprising spray drying the mixture.

12. A product of the process according to claim 10 wherein the at least one collected volatile fraction is mixed with the carrier in an amount of from 2.5% to 50% by weight based upon the weight of the at least one collected fraction and the carrier.

13. A product of the process according to claim 1 further comprising fatty acids in admixture with the material to be heated.

14. A product of the process according to claim 1 further comprising sulphur-containing compounds in admixture with the material to be heated.

15. A product of the process according to claim 1 wherein the material is heated for a period of from 1 minute to 6 hours while introducing oxygen by bubbling air into the heated liquid pool of material at a rate of from 10 ml to 5000 ml/min per 100 gm of the heated pool of material.

* * * * *

UNITED STATES PATENT AND TRADEMARK OFFICE
CERTIFICATE OF CORRECTION

PATENT NO. : 5,158,795
DATED : October 27, 1992
INVENTOR(S) : Teh-Kuei CHEN, et al.

It is certified that error appears in the above-identified patent and that said Letters Patent is hereby corrected as shown below:

Column 6, line 42, (line 4 of claim 1), "300 1°", should be --300°--.

Column 7, line 12, (line 3 of claim 11), "the" should be --a--.

Column 8, line 14, (line 5 of claim 15), "10 ml" should be --10 ml/min--.

Signed and Sealed this

Twelfth Day of October, 1993

BRUCE LEHMAN

*Attest:*

*Attesting Officer*  *Commissioner of Patents and Trademarks*